United States Patent
Tong et al.

[11] Patent Number: 6,006,083
[45] Date of Patent: Dec. 21, 1999

[54] TONE DETECTION

[75] Inventors: Wen Tong; Rui Wang, both of Ottawa, Canada

[73] Assignee: Nortel Networks Corporation, Montreal, Canada

[21] Appl. No.: 08/927,724

[22] Filed: Sep. 11, 1997

[51] Int. Cl.[6] .................................................. H04B 1/00
[52] U.S. Cl. ............................................ 455/401; 379/386
[58] Field of Search ............................. 379/386; 327/556, 327/551; 455/401

[56] References Cited

U.S. PATENT DOCUMENTS

| | | | |
|---|---|---|---|
| 4,450,417 | 5/1984 | Folkmann | 333/24 R |
| 4,546,490 | 10/1985 | Miller-Thomson et al. | 381/56 |
| 4,599,495 | 7/1986 | Richards | 179/84 VF |
| 5,408,529 | 4/1995 | Greaves | 379/386 |
| 5,818,929 | 10/1998 | Yaguchi | 379/386 |

Primary Examiner—Reinhard J. Eisenzopf
Assistant Examiner—Makoto Aoki
Attorney, Agent, or Firm—R. John Haley

[57] ABSTRACT

AMPS (Advanced Mobile Phone System) ST (signalling tone) is detected by a tone detector in which samples of a demodulated signal are amplitude limited to remove click energy, and the limited signal is bandpass filtered, using a notch filter and summer, to limit it to the range of possible ST frequency. Power of the bandpass filtered signal is detected, and compared with detected power of a version of the bandpass filtered signal from which any sinusoidal signal has been eliminated, independent of frequency, to provide for ST detection. A function $[x(k)+x(k-2)]x(k-2)-[x(k-1)+x(k-3)]x(k-3)$ for successive samples $x(k)$ of the bandpass filtered signal is used for the sinusoidal signal elimination. The invention can also be used to detect other tones.

12 Claims, 1 Drawing Sheet

TONE DETECTION

This invention relates to tone detection. The invention is particularly, but not exclusively, concerned with detection of the signalling tone (ST) in AMPS (Advanced Mobile Phone System) cellular radio or wireless communications systems.

BACKGROUND OF THE INVENTION

In an AMPS communications system FM (frequency modulation) is used for communicating voice signals with a frequency in the range from 300 to 3400 Hz, a supervisory audio tone (SAT) with a nominal frequency selected from three possible nominal frequencies of 5970, 6000, and 6030 Hz, and a signalling tone (ST) with a nominal frequency of 10 kHz. The ST, which has a nominal FM peak deviation (range of frequency change) of 8 kHz, is used by mobile (or fixed) terminals to communicate with base stations in accordance with an AMPS protocol that assigns different burst durations of the ST to different events. For example, ST burst durations of 50 ms, 400 ms, and 1800 ms correspond respectively to a hand-off acknowledgement, a request to send dialled digits, and a release. In order to detect such bursts, the ST detector must have an attack time (time from the start of a burst to report the presence of ST) of 30 ms or less and a release time (time from the end of a burst to report the loss of ST) of 300 ms or less. These requirements must be met whether or not the SAT is present at any of its frequencies.

Different terminals may produce the ST with considerable variations, from their nominal values, of ST frequency and peak deviation. More specifically, different terminals may produce the ST with a frequency anywhere in a range of 9.5 to 10.5 kHz, and with a peak deviation anywhere in a range of 6 to 10 kHz. An ST detector in a base station is required to detect the ST regardless of these variations.

Furthermore, the communications channel is subject to co-channel interference (CCI), and both the CCI and desired signals are subject to fading. The output of the demodulator of the base station, to which the ST detector is responsive, consequently has highly variable signal and noise (including interference) powers, and can contain high-amplitude clicks. Reliable detection of the ST is still required in these circumstances.

It is known to use a PLL (phase-locked loop) for detecting a tone of known frequency, but this is not generally satisfactory for AMPS ST detection because the input additive noise is not white Gaussian, the ST can be considerably offset from its nominal frequency, and a short attack time is required of the ST detector in order to detect relatively short ST bursts.

Miller-Thomson et al. U.S. Pat. No. 4,546,490 issued Oct. 8, 1995 entitled "Single Frequency Detection Circuit" describes a detector for detecting, in the presence of voice signals at a lower level by at least 10 dB, the SF (single frequency) 2600 Hz in-band signalling tone in telephone equipment. That detector rectifies and filters the incoming signal to produce a signal without the fundamental component of any SF tone which may be present, low pass filters the signal and determines a magnitude of any SF tone from the resulting d.c. component, and also high pass filters the signal and further rectifies and filters the result to determine a magnitude of the voice signal, comparing the magnitudes to determine the presence or absence of the SF tone. Such a detector can take advantage of the 10 dB or more difference between levels of any SF tone and voice signals, and is not required to accommodate the fading and CCI to which AMPS signals are subject. In addition, the design of the filters in such a detector can rely on the relatively small (±38 Hz, or less than 1.5%) possible variation in the frequency of the SF tone, in comparison to the relatively wider (±0.5 kHz, or 5%) possible variation in the frequency of the AMPS ST.

An object of this invention is to provide an improved tone detector and method of tone detection, which can facilitate ST detection in an AMPS communications system.

SUMMARY OF THE INVENTION

One aspect of this invention provides a tone detector comprising: a power detector for detecting power of an input signal; a sinusoidal signal eliminator responsive to the input signal to eliminate any sinusoidal signal therein independently of its frequency within a bandwidth of the input signal; a power detector for detecting power of an output of the sinusoidal signal eliminator; and a comparator responsive to the powers detected by the power detectors to provide an indication of the presence or absence of a tone in the input signal.

Preferably the input signal comprises a sampled signal having successive samples $x(k)$, and the sinusoidal signal eliminator comprises apparatus for producing at its output samples substantially equal to $[x(k)+x(k-2)]x(k-2)-[x(k-1)+x(k-3)]x(k-3)$. The tone detector desirably includes a bandpass filter for producing the input signal from an incoming signal, and preferably the bandpass filter comprises a notch filter, having a notch at a predetermined frequency of a tone to be detected, for producing a filtered signal from the incoming signal, and a summer for subtracting the filtered signal from the incoming signal to produce the input signal. The tone detector can further include an amplitude limiter via which the incoming signal is supplied to the bandpass filter.

Another aspect of this invention provides a detector for detecting a signalling tone in a wireless communications system using frequency modulation, comprising: an amplitude limiter responsive to samples of a demodulated signal for producing a limited signal; a bandpass filter for filtering the limited signal to produce a filtered signal having a bandwidth corresponding to a possible frequency range of the signalling tone; a sinusoidal signal eliminator responsive to the filtered signal to eliminate any sinusoidal signal therein independently of its frequency within said bandwidth; power detectors for determining powers of the filtered signal and an output of the sinusoidal signal eliminator; and a comparator responsive to the powers determined by the power detectors to determine the presence or absence of the signalling tone.

The invention also provides a method of tone detection comprising the steps of: eliminating any sinusoidal signal from an input signal which may contain a tone to be detected; and comparing powers of the input signal before and after the sinusoidal signal elimination to detect the tone.

The method preferably further comprises the step of bandpass filtering an incoming signal to produce the input signal, and amplitude limiting a demodulated signal to produce the incoming signal. The step of bandpass filtering can comprise notch filtering the incoming signal and subtracting a result from the incoming signal. The step of eliminating any sinusoidal signal from the input signal preferably comprises producing output samples substantially equal to $[x(k)+x(k-2)]x(k-2)-[x(k-1)+x(k-3)]x(k-3)$ from successive samples $x(k)$ of the input signal.

BRIEF DESCRIPTION OF THE DRAWINGS

The invention will be further understood from the following description with reference to the accompanying drawings, in which.

DETAILED DESCRIPTION

Figure 1:
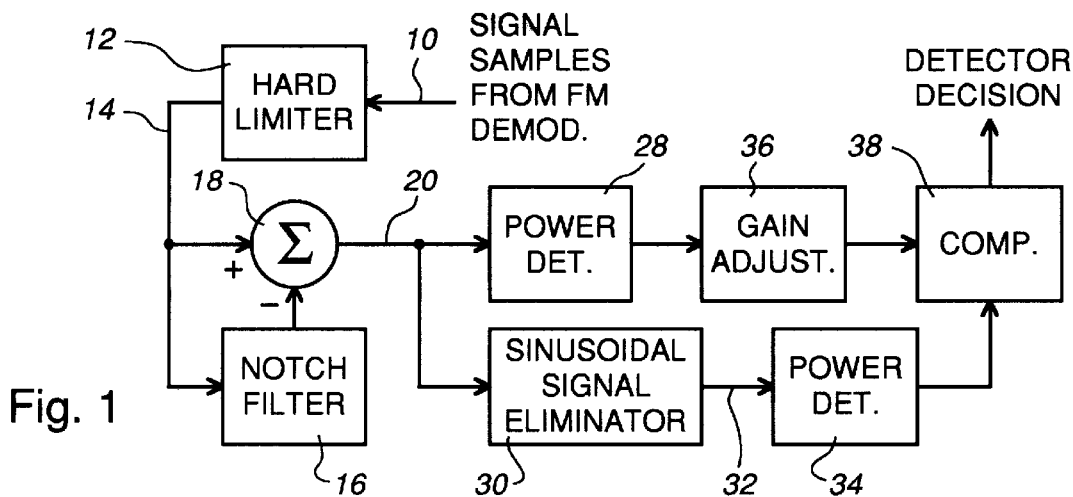
FIG. 1 illustrates in a block diagram an AMPS ST detector in accordance with an embodiment of this invention.

Referring to FIG. 1, a block diagram illustrates an AMPS ST (10 kHz signalling tone) detector in accordance with an embodiment of the invention. A signal supplied to the ST detector on a line 10 is constituted by an output of an FM demodulator (not shown) of a receiver of an AMPS base station. As is known in the art, this signal is a sampled signal having a sampling rate of 48.6 kHz, corresponding to a sampling period T of 20.57 μs.

This demodulated signal on the line 10 is supplied to a hard limiter 12, which serves to limit the amplitude of signals supplied to a line 14 to normal signal amplitudes, thereby removing most of the noise energy of high-amplitude clicks in the signal from the FM demodulator.

The incoming signal on the line 14 is supplied to an ST enhancer which is constituted by a notch filter 16 and a summer 18, to produce a resulting input signal on a line 20. More particularly, the signal on the line 14 is supplied to an additive input of the summer 18 and to an input of the notch filter 16, and an output of the notch filter 16 is supplied to a subtractive input of the summer 18, the output of which produces the signal on the line 20. The notch filter 16 has a notch with a center frequency of 10 kHz corresponding to the nominal ST frequency and a width corresponding to the ±0.5 kHz variation of the ST frequency discussed above. The arrangement of the notch filter 16 and the summer 18 consequently removes signal components at other frequencies, providing a relative gain or enhancement for signal components at or close to the ST nominal frequency of 10 kHz. The sharpness of the notch of the notch filter 16 is such that this enhancement is considerably greater the closer the signal component frequency is to 10 kHz.

Figure 2:
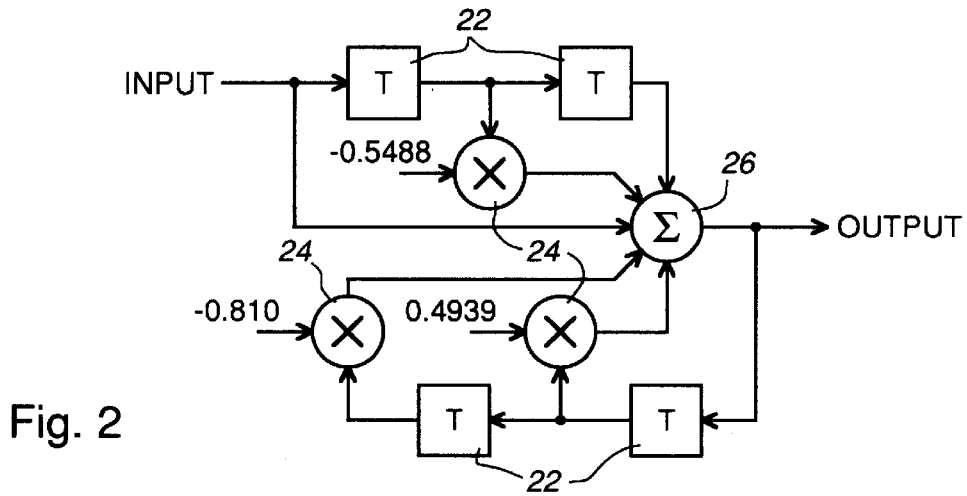
FIG. 2 illustrates a notch filter of the detector of FIG. 1.

FIG. 2 illustrates one form of the notch filter 16, which comprises four delay elements 22 each providing a delay of the sampling period T, three multipliers 24 having respective multiplier coefficients as indicated in FIG. 2, and a summer 26 providing the output signal of the filter, arranged as a feed-forward and feed-back tapped delay line. Other forms of notch filter may alternatively be used.

The signal on the line 20 consequently comprises narrow band Gaussian noise and any ST which may be present. The ST is a sinusoidal signal with a frequency, as discussed above, in the range of 10±0.5 kHz. The noise (including any interference in the frequency band of signals on the line 20), has a variable level.

The signal plus noise power, or energy, of the signal on the line 20 is determined by a power detector 28, which accumulates over a predetermined number of samples the squared magnitude of the signal on the line 20 and supplies the logarithm of the result to its output. For example, for samples x(k) of the signal on the line 20 accumulated over 200 consecutive samples for values of k from 1 to 200, corresponding to an accumulation period of about 4.1 ms at the sampling frequency of 48.6 kHz, the output of the power detector 28 can be expressed as $$\log\left(\sum_{k=1}^{200}|x(k)|^2\right)$$

The signal on the line 20 is also supplied to a sinusoidal signal eliminator, or annihilator, 30, the output of which on a line 32 is supplied to another power detector 34. The power detector 34 is similar to, and operates similarly to, the power detector 28, except that it determines the power of the output of the eliminator 30 on the line 32. As this is the signal plus noise from the line 20, minus any sinusoidal signal which is removed by the eliminator 30 as described below, the power detector 34 determines a noise power which represents the power of the noise component of the signal and noise on the line 20.

The signal plus noise power determined by the detector 28, adjusted by a gain factor in a gain adjuster 36, is compared in a comparator 38 with the noise power determined by the detector 34 to reach a soft decision that the ST is present when the former is greater than the latter, and is otherwise absent. As this soft decision is updated every 4.1 ms as described above, further processing can be carried out on successive soft decisions, within the attack and release times referred to above, to produce reliable final decisions on the presence and absence of the ST. For example, the presence of the ST may be determined in response to a single soft decision that the ST is present, and the loss of ST may be determined in response to a plurality of repeated soft decisions that the ST is absent. The latter reduces false detection of loss of ST in the presence of deep fading.

Because the power detectors 28 and 34 produce logarithmic outputs as described above, the gain factor is conveniently implemented by addition of a constant in an adder which constitutes the gain adjuster 36. A theoretical value of this gain constant is 9, but this can be determined and/or adjusted empirically or by simulation to optimize the operation of the ST detector. Simulation has indicated that, to achieve a constant and low (e.g. $10^{-6}$) probability of false detection of ST, a lower value such as 5.6 may be chosen.

The operation of the ST detector as described above relies on the operation of the sinusoidal signal eliminator 30 to annihilate any ST which may be present in the signal on the line 20, without also eliminating noise. As can be appreciated, any ST that is present can have a frequency that is variable (from 9.5 to 10.5 kHz) and an arbitrary amplitude and phase. Conventional techniques, such as bandpass filtering, can not meet these requirements. The sinusoidal signal eliminator 30 is arranged to produce, in response to successive samples x(k) at its input, an output:

$$[x(k)+x(k-2)]x(k-2)-[x(k-1)+x(k-3)]x(k-3)$$

It can be shown that this function will reject a sinusoid $s(k)=A \sin(\omega+\phi)$ regardless of (and hence without knowledge of) its amplitude A, frequency ω, or initial phase φ, but does not reject non-sinusoidal signals.

Figure 3:
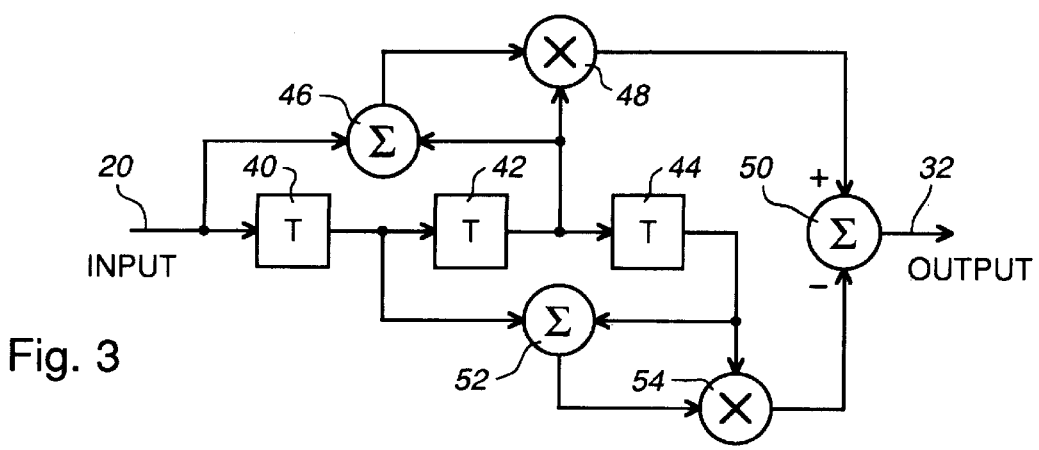
FIG. 3 illustrates a sinusoidal signal eliminator of the detector of FIG. 1.

The sinusoidal signal eliminator 30 is constituted by an arrangement as shown in FIG. 3 which implements the above function. The arrangement comprises a delay line constituted by three successive delay elements 40, 42, and 44 each providing a delay by the sampling period T, thereby producing at their outputs delayed samples x(k-1), x(k-2), and x(k-3) respectively in response to samples x(k) of the signal on the line 20 supplied to the input of the eliminator 30. The input samples x(k) and the samples x(k−2) at the output of the second delay element 42 are added in a summer 46. The output of the summer 46 is multiplied in a multiplier 48 by the output x(k−2) of the delay element 42, and the output of the multiplier 48 is supplied to an additive input of a summer 50. The samples x(k−1) and x(k−3) at the outputs of the delay elements 40 and 44 respectively are added in a summer 52, the output of this is multiplied by the output x(k−3) of the delay element 44 in a multiplier 54, and the resulting product is supplied to a subtractive input of the summer 50. The resulting output samples from the summer 50, in accordance with the above function, are supplied to the output line 32 of the sinusoidal signal eliminator 30.

It can be appreciated from the above description that the hard limiter 12 removes noise energy of high-amplitude clicks in the input signal, and the ST enhancer constituted by the notch filter 16 and summer 18 has a bandpass filtering effect to remove signals other than those in the ST frequency range of 9.5 to 10.5 kHz. In particular, this removes voice signals and supervisory audio tones at frequencies of about 6 kHz from the signal produced on the line 20. The sinusoidal signal eliminator 30 eliminates any sinusoidal signal component in this ST frequency range, i.e. removes any ST that is present, to leave only a noise component whose energy or power is determined by the power detector 34 to establish an adaptively variable noise floor or threshold. The power detector 28 determines the power of the signal plus noise on the line 20, which with the appropriate gain factor is compared by the comparator 38 with the noise threshold for the corresponding period to provide a reliable indication of the presence or absence of any sinusoidal signal, i.e. ST, on the line 20 and hence in the input signal to the ST detector. As indicated above, further processing of this indication, such as only determining a loss of ST after a plurality of failures to detect the ST by the comparator 38, can further enhance the reliability of the ST detection while still meeting the required attack and release times for ST detection.

It can be appreciated that the functions of the ST detector described above can conveniently be implemented in a digital signal processor integrated circuit, which can also perform the further processing discussed above as well as possibly other functions of an AMPS base station receiver.

Although particular forms of the ST detector, notch filter 16, and sinusoidal signal eliminator 30 are described above, it is observed that these are given by way of example, and numerous variations, modifications, and adaptations may be made therein without departing from the scope of the claims. For example, it can be appreciated that the gain factor discussed above can be adaptively varied, rather than being constant as described above. In addition, it can be appreciated that although the invention has been described in its application to AMPS ST detection, the invention can alternatively be applied to the detection of any tone in any system. The invention can also be applied to the detection of each of a plurality of tones at different frequencies for each of which a respective notch filter frequency is provided, such as are provided in DTMF (dual-tone multi-frequency) signalling arrangements.

Numerous other modifications, variations, and adaptations may be made to the described embodiments without departing from the scope of the invention as defined in the claims.

We claim:

1. A tone detector comprising:

a power detector for detecting power of an input signal;

a sinusoidal signal eliminator responsive to the input signal to eliminate any sinusoidal signal therein independently of its frequency within a bandwidth of the input signal;

a power detector for detecting power of an output of the sinusoidal signal eliminator; and a comparator responsive to the powers detected by the power detectors to provide an indication of the presence or absence of a tone in the input signal;

wherein the input signal comprises a sampled signal having successive samples x(k), and the sinusoidal signal eliminator comprises apparatus for producing at its output samples substantially equal to $\{x(k)+x(k-2)\}x(k-2)-\{x(k-1)+x(k-3)\}x(k-3)$.

2. A tone detector as claimed in claim 1 and including a bandpass filter for producing the input signal from an incoming signal.

3. A tone detector as claimed in claim 2 wherein the bandpass filter comprises a notch filter, having a notch at a predetermined frequency of a tone to be detected, for producing a filtered signal from the incoming signal, and a summer for subtracting the filtered signal from the incoming signal to produce the input signal.

4. A tone detector as claimed in claim 3 and including an amplitude limiter via which the incoming signal is supplied to the bandpass filter.

5. A tone detector as claimed in claim 2 and including an amplitude limiter via which the incoming signal is supplied to the bandpass filter.

6. A detector for detecting a signalling tone in a wireless communications system using frequency modulation, comprising:

an amplitude limiter responsive to samples of a demodulated signal for producing a limited signal:

a bandpass filter for filtering the limited signal to produce a filtered signal having a bandwidth corresponding to a possible frequency range of the signalling tone;

a sinusoidal signal eliminator responsive to the filtered signal to eliminate any sinusoidal signal therein independently of its frequency within said bandwidth;

power detectors for determining powers of the filtered signal and an output of the sinusoidal signal eliminator; and a comparator responsive to the powers determined by the power detectors to determine the presence or absence of the signalling tone;

wherein the sinusoidal signal eliminator is arranged to produce at its output, in response to successive samples x(k) of the filtered signal, samples substantially equal to $\{x(k)+x(k-2)\}x(k-2)-\{x(k-1)+x(k-3)\}x(k-3)$.

7. A tone detector as claimed in claim 6 wherein the bandpass filter comprises a notch filter, responsive to the limited signal, and a summer for subtracting an output of the notch filter from the limited signal to produce the filtered signal.

8. A method of tone detection comprising the steps of:

eliminating any sinusoidal signal from an input signal which may contain a tone to be detected, said step of eliminating any sinusoidal signal from the input signal comprising producing output samples substantially equal to $\{x(k)+x(k-2)\}x(k-2)-\{x(k-1)+x(k-3)\}x(k-3)$ from successive samples x(k) of the input signal; and comparing powers of the input signal before and after the sinusoidal signal elimination to detect the tone.

9. A method as claimed in claim 8 and further comprising the step of bandpass filtering an incoming signal to produce the input signal.

10. A method as claimed in claim 9 wherein the step of bandpass filtering comprises notch filtering the incoming signal and subtracting a result from the incoming signal.

11. A method as claimed in claim 10 and further comprising the step of amplitude limiting a demodulated signal to produce the incoming signal.

12. A method as claimed in claim 9 and further comprising the step of amplitude limiting a demodulated signal to produce the incoming signal.

* * * * *